United States Patent
Lin et al.

(10) Patent No.: US 11,353,975 B2
(45) Date of Patent: Jun. 7, 2022

(54) BACKLIGHT MODULE AND TOUCH DISPLAY DEVICE USING THE BACKLIGHT MODULE

(71) Applicant: TPK Universal Solutions Limited, Wanchai (HK)

(72) Inventors: Ming Chuan Lin, Taichung (TW); Hsuan Kuang Chen, Taichung (TW); Su Ming Lin, Taichung (TW); Chun Hui Tseng, Changhua (TW); Wen Hung Wang, Taichung (TW)

(73) Assignee: TPK Universal Solutions Limited, Wanchai (HK)

( * ) Notice: Subject to any disclaimer, the term of this patent is extended or adjusted under 35 U.S.C. 154(b) by 0 days.

(21) Appl. No.: 17/078,254

(22) Filed: Oct. 23, 2020

(65) Prior Publication Data

US 2021/0405796 A1    Dec. 30, 2021

(30) Foreign Application Priority Data

Jun. 30, 2020 (CN) .......................... 202010612492.5

(51) Int. Cl.
*G06F 3/041* (2006.01)
*G06F 3/044* (2006.01)
(Continued)

(52) U.S. Cl.
CPC ........ *G06F 3/0412* (2013.01); *G02F 1/13338* (2013.01); *G02F 1/133603* (2013.01);
(Continued)

(58) Field of Classification Search
CPC .. G06F 3/0412; G06F 3/04166; G06F 3/0446; G06F 3/046; G06F 3/0418;
(Continued)

(56) References Cited

U.S. PATENT DOCUMENTS

2012/0169400 A1 * 7/2012 Liu .................... G06F 3/04166
                                                   327/517
2014/0078104 A1 * 3/2014 Lee ....................... G06F 3/0412
                                                   345/174
(Continued)

FOREIGN PATENT DOCUMENTS

TW           201441908 A      11/2014
TW           I567606 B         1/2017
(Continued)

*Primary Examiner* — Lisa S Landis
(74) *Attorney, Agent, or Firm* — Cooper Legal Group, LLC

(57) ABSTRACT

The present disclosure is related to a touch technology field and provides a backlight module and a touch display device using the backlight module. The backlight module includes a substrate, plural driving electrode lines, plural receiving electrode lines, and plural light sources. The driving electrode lines are disposed on the substrate. The receiving electrode lines are disposed on the substrate, in which the receiving electrode lines and the driving electrode lines define plural light source regions on the substrate. The lights sources are disposed in the light source regions, in which each of the light source regions includes at least one of the light sources. The touch display device includes the backlight module and a display panel. The backlight module is configured to provide backlight light. The display panel is disposed on the backlight module to use the backlight light to display images.

20 Claims, 6 Drawing Sheets

(51) Int. Cl.
*G06F 3/046* (2006.01)
*G02F 1/1333* (2006.01)
*G02F 1/13357* (2006.01)
*G02F 1/1335* (2006.01)

(52) U.S. Cl.
CPC ............ *G06F 3/046* (2013.01); *G06F 3/0446* (2019.05); *G06F 3/04166* (2019.05); *G02F 1/133612* (2021.01); *G06F 3/0418* (2013.01); *G06F 2203/04103* (2013.01); *G06F 2203/04106* (2013.01)

(58) Field of Classification Search
CPC .......... G06F 2203/004103; G06F 2203/04106; G02F 1/13338; G02F 1/133603; G02F 1/133612
See application file for complete search history.

(56) References Cited

U.S. PATENT DOCUMENTS

| 2016/0048247 A1* | 2/2016 | Han ................... G02F 1/13338 345/174 |
| 2016/0116779 A1 | 4/2016 | Yeh et al. |
| 2017/0277317 A1* | 9/2017 | Lee ................... G02F 1/13338 |

FOREIGN PATENT DOCUMENTS

| TW | I684123 B | 2/2020 |
| TW | M608817 U | 3/2021 |

* cited by examiner

BACKLIGHT MODULE AND TOUCH DISPLAY DEVICE USING THE BACKLIGHT MODULE

CROSS-REFERENCE TO RELATED APPLICATION

This application claims priority to China Application Serial Number 202010612492.5, filed Jun. 30, 2020, which is herein incorporated by reference in its entirety.

BACKGROUND

Technical Field

The present disclosure relates to a backlight module and a touch display device using the backlight module. More particularly, the present disclosure relates to a backlight module integrating a touch function and a touch display device using the backlight module.

Description of Related Art

A touch display device is extensively used in various electronic devices, such as smart phones, tablets, cameras, eBook readers and so on. A conventional touch display device includes a backlight module, a display panel, a capacitive touch sensing plate, and an electromagnetic touch sensing plate, in which the capacitive touch sensing plate includes a capacitive touch sensing module and capacitive touch sensing lines to sense the touch of a user, and the electromagnetic touch sensing plate includes an electromagnetic touch sensing module and electromagnetic touch sensing lines to sense the touch of an electromagnetic pen. However, the capacitive touch sensing plate and the electromagnetic touch sensing plate are stacked on the display panel, and the arrangement of the capacitive touch sensing plate and the electromagnetic touch sensing plate leads to significant increase in the thickness of the touch display device and interference between the capacitive touch sensing plate and the electromagnetic touch sensing plate when the capacitive touch sensing plate and the electromagnetic touch sensing plate are operating. Therefore, there is a need for a new touch display device to overcome the problems of the significantly increased thickness and the easily produced interference of the conventional touch display device.

SUMMARY

In order to solve the above problems, an objective of the present disclosure is to provide a backlight module integrating a capacitive touch sensing function and an electromagnetic touch sensing function, and performing the capacitive touch sensing function and the electromagnetic touch sensing function in different time periods to avoid the interference between the capacitive touch sensing and the electromagnetic touch sensing.

An another aspect of the present disclosure is to provide a touch display device using the above backlight module for integrating the capacitive touch sensing function and the electromagnetic touch sensing function, and performing the capacitive touch sensing function and the electromagnetic touch sensing function in different time periods to avoid the interference between the capacitive touch sensing and the electromagnetic touch sensing.

Technical Schemes of the Present Disclosure are as Follows

A backlight module includes a substrate, a plurality of driving electrode lines, a plurality of receiving electrode lines, and a plurality of light sources. The driving electrode lines are disposed on the substrate. The receiving electrode lines are disposed on the substrate, in which the receiving electrode lines and the driving electrode lines define a plurality of light source regions on the substrate. The light sources are disposed in the light source regions. Each of the light source regions has at least one of the light sources disposed therein.

In some embodiments, the light sources are light-emitting diodes.

In some embodiments, the backlight module further includes a switch module, a capacitive touch sensing module, and an electromagnetic touch sensing module. The switch module is configured to electrically connect the capacitive touch sensing module with the receiving electrode lines and the driving electrode lines in a first touch sensing period and to electrically connect the electromagnetic touch sensing module with the receiving electrode lines and the driving electrode lines in a second touch sensing period. The capacitive touch sensing module is configured to perform touch sensing by using the receiving electrode lines and the driving electrode lines in the first touch sensing period. The electromagnetic touch sensing module is configured to perform touch sensing by using the receiving electrode lines and the driving electrode lines in the second touch sensing period.

In some embodiments, the substrate is a printed circuit board.

In some embodiments, the receiving electrode lines and the driving electrode lines are copper conductive lines.

A touch display device includes a backlight module and a display panel. The backlight module is configured to provide backlight light, and the display panel is disposed on the backlight module to use the backlight light to display images. The backlight module includes a substrate, a plurality of driving electrode lines, a plurality of receiving electrode lines, and a plurality of light sources. The driving electrode lines are disposed on the substrate. The receiving electrode lines are disposed on the substrate, in which the receiving electrode lines and the driving electrode lines define a plurality of light source regions on the substrate. The light sources are disposed in the light source regions. Each of the light source regions has at least one of the light sources disposed therein.

In some embodiments, the light sources are light-emitting diodes.

In some embodiments, the backlight module further includes a switch module, a capacitive touch sensing module, and an electromagnetic touch sensing module. The switch module is configured to electrically connect the capacitive touch sensing module with the receiving electrode lines and the driving electrode lines in a first touch sensing period and to electrically connect the electromagnetic touch sensing module with the receiving electrode lines and the driving electrode lines in a second touch sensing period. The capacitive touch sensing module is configured to perform touch sensing by using the receiving electrode lines and the driving electrode lines in the first touch sensing period. The electromagnetic touch sensing module is configured to perform touch sensing by using the receiving electrode lines and the driving electrode lines in the second touch sensing period.

In some embodiments, the substrate is a printed circuit board.

In some embodiments, the receiving electrode lines and the driving electrode lines are copper conductive lines.

In the present disclosure, the receiving electrode lines and the driving electrode lines are disposed on the substrate (e.g., a printed circuit board) of the backlight module, and the capacitive touch sensing module and the electromagnetic touch sensing module are integrated into the backlight module to perform the capacitive touch sensing and the electromagnetic touch sensing in different time periods, thereby avoiding the interference between the capacitive touch sensing and the electromagnetic touch sensing and decreasing the thickness of the touch display device.

BRIEF DESCRIPTION OF THE DRAWINGS

Aspects of the present disclosure are better understood from the following detailed description in conjunction with the accompanying figures. It is noted that in accordance with the standard practice in the industry, various features are not drawn to scale. In fact, the dimensions of the various features can be arbitrarily increased or reduced for clarity of discussion.

DETAILED DESCRIPTION

In order to make the objectives, technique schemes, and advantages of the present disclosure become better understood, the disclosure is described in detail below with reference made to the accompanying drawings, embodiments, and examples. It is to be appreciated that the specific embodiments and examples described herein are used to explain the present disclosure only and are not intended to limit the scope of the claims.

Figure 1:
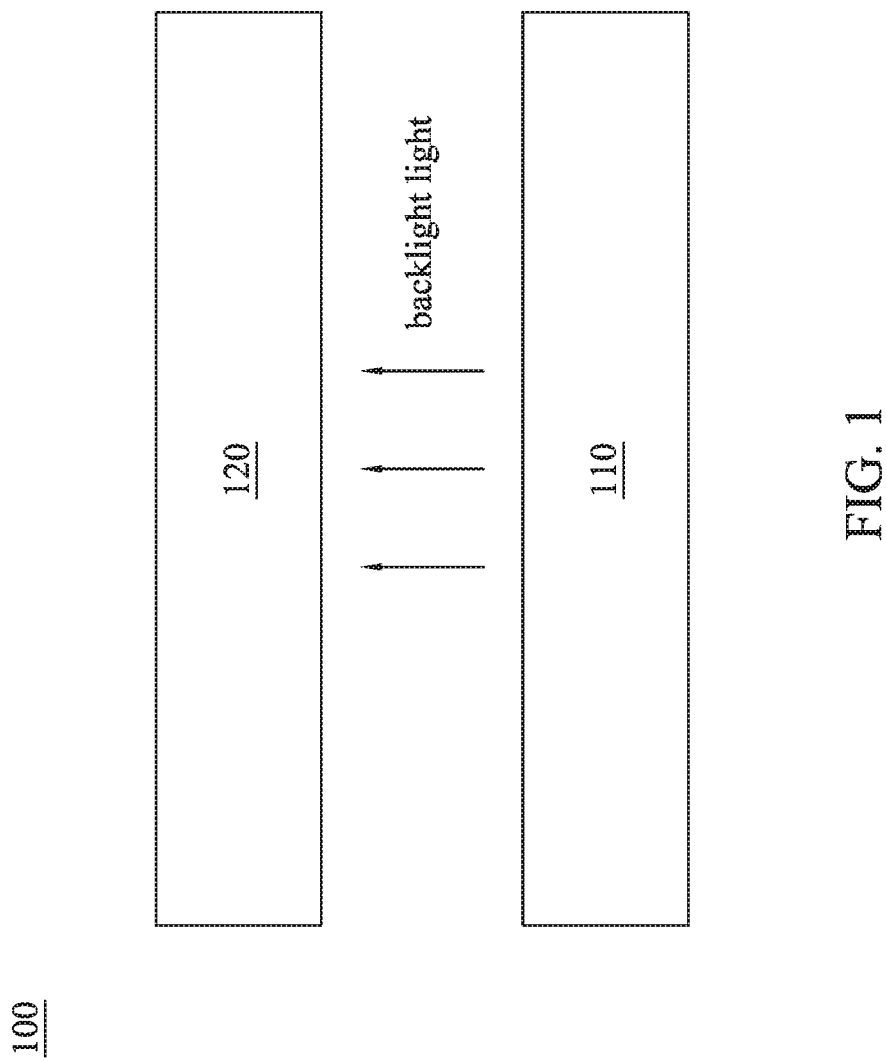
FIG. 1 is a schematic diagram showing a structure of a touch display device in accordance with an embodiment of the present disclosure.

Referring to FIG. 1, FIG. 1 is a schematic diagram showing a structure of a touch display device 100 in accordance with an embodiment of the present disclosure. The touch display device 100 includes a backlight module 110 and a display panel 120. The backlight module 110 is used to provide backlight light required by the display panel 120, and the display panel 120 is disposed on the backlight module 110 to use the backlight light to display images. In this embodiment, the backlight module 110 is a direct-type backlight module, and the display panel 120 is a liquid crystal display panel.

Figure 2:
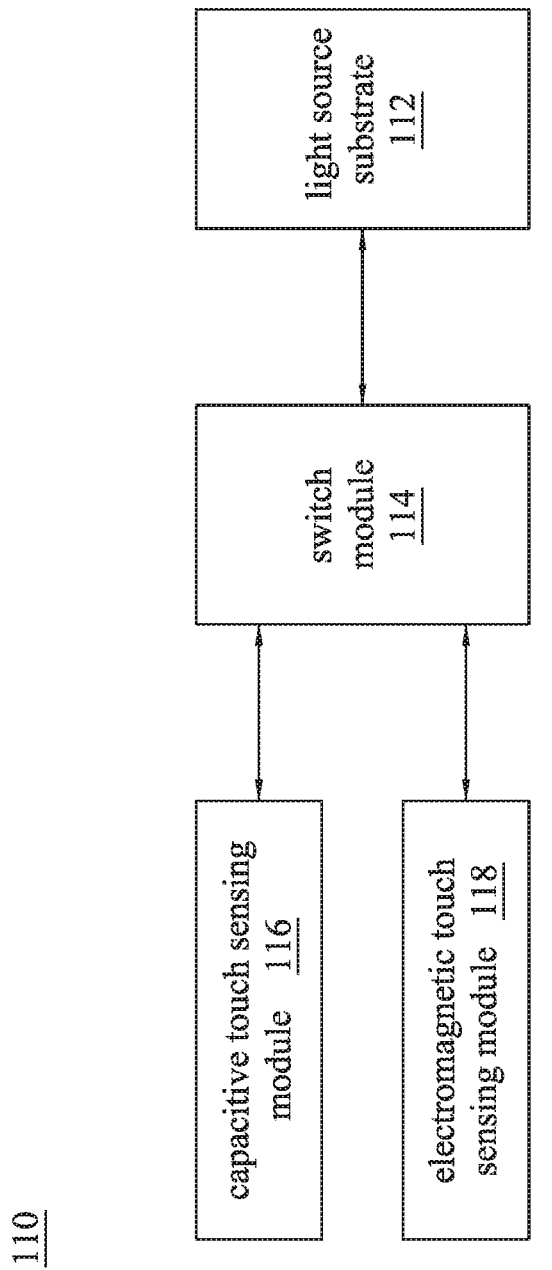
FIG. 2 is a functional block diagram of the backlight module in accordance with an embodiment of the present disclosure.
Figure 3:
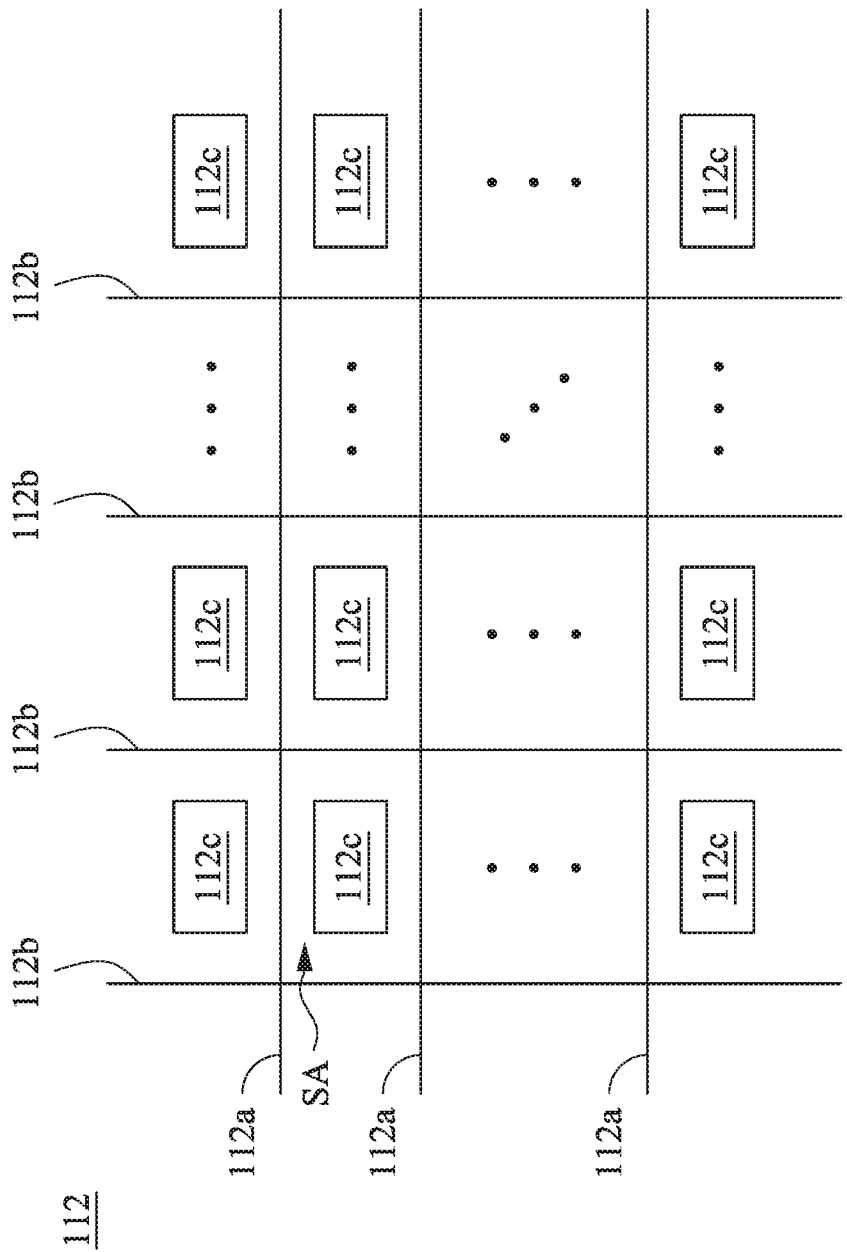
FIG. 3 is a schematic diagram showing a partial structure of a light source substrate in accordance with an embodiment of the present disclosure.
Figure 4:
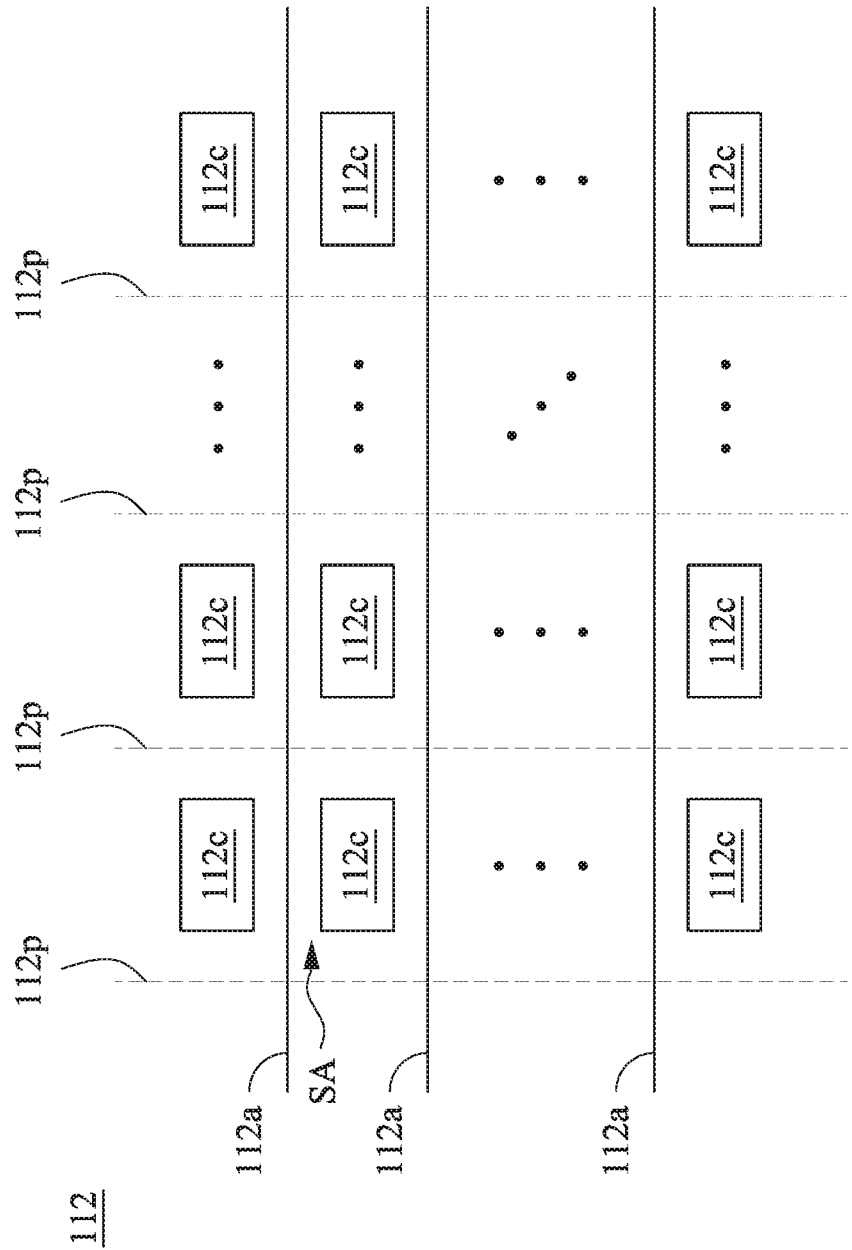
FIG. 4 is a schematic diagram showing a partial structure of a light source substrate in accordance with an embodiment of the present disclosure.

Referring FIG. 2 and FIG. 3, FIG. 2 is a functional block diagram of the backlight module 110 in accordance with an embodiment of the present disclosure, and FIG. 3 is a schematic diagram showing a partial structure of a light source substrate 112 in accordance with an embodiment of the present disclosure. The backlight module 110 includes the light source substrate 112, a switch module 114, a capacitive touch sensing module 116, and an electromagnetic touch sensing module 118. The light source substrate 112 includes a substrate (not shown), driving electrode lines 112a, receiving electrode lines 112b, and light sources 112c. The substrate may be a printed circuit board, such as a copper foil substrate. The driving electrode lines 112a, the receiving electrode lines 112b, and the light sources 112c are disposed on the substrate, in which the driving electrode lines 112a and the receiving electrode lines 112b are disposed in gaps between the light sources 112c. In other words, the light sources 112c are disposed in light source regions SA defined by the driving electrode lines 112a and the receiving electrode lines 112b. In this embodiment, the driving electrode lines 112a and the receiving electrode lines 112b are disposed on the same surface of the substrate and intersect each other orthogonally to define the light source regions SA. With respect to the locations where the driving electrode lines 112a and the receiving electrode lines 112b intersect, the driving electrode lines 112a pass through and underneath the receiving electrode lines 112b by using vias, or the receiving electrode lines 112b pass through and underneath the driving electrode lines 112a by using vias. In another embodiment of the present disclosure, the driving electrode lines 112a and the receiving electrode lines 112b can be disposed on different surfaces of the substrate. For example, the driving electrode lines 112a and the light source 112c are disposed on a front surface of the substrate, and the receiving electrode lines 112b are disposed on a back surface of the substrate. Projections 112p of the receiving electrode lines 112b on the front surface and the driving electrode lines 112a can define the light source regions SA, as shown in FIG. 4. In still another embodiment of the present disclosure, the substrate can be a multilayer circuit board, and the driving electrode lines 112a and/or the receiving electrode lines 112b can be disposed in inner layers of the substrate.

In this embodiment, the light sources 112c are light-emitting diodes, and the driving electrode lines 112a and the receiving electrode lines 112b are copper conductive lines. For example, the driving electrode lines 112a and the receiving electrode lines 112b can be formed by using copper layers of the substrate. Because the driving electrode lines 112a and the receiving electrode lines 112b are copper conductive lines, the resistance of the driving electrode lines 112a and the receiving electrode lines 112b is lower than the resistance of conventional driving electrode lines and receiving electrode lines made from indium tin oxide (ITO).

Returning to FIG. 2, the backlight module 110 not only includes light sources 112c for providing the backlight light required by the display panel 120, but also integrates the capacitive touch sensing module 116 and the electromagnetic touch sensing module 118 for enabling a capacitive touch sensing function and an electromagnetic touch sensing function. Specifically, the capacitive touch sensing module 116 and the electromagnetic touch sensing module 118 are electrically connected to the driving electrode lines 112a and the receiving electrode lines 112b of the light source substrate 112 through the switch module 114, so as to use the driving electrode lines 112a and the receiving electrode lines 112b to perform the capacitive touch sensing function and the electromagnetic touch sensing function. The switch module 114 is used to switch the capacitive touch sensing module 116 and the electromagnetic touch sensing module 118 to electrically connect one of the capacitive touch sensing module 116 or the electromagnetic touch sensing module 118 with the driving electrode lines 112a and the receiving electrode lines 112b.

Figure 5:
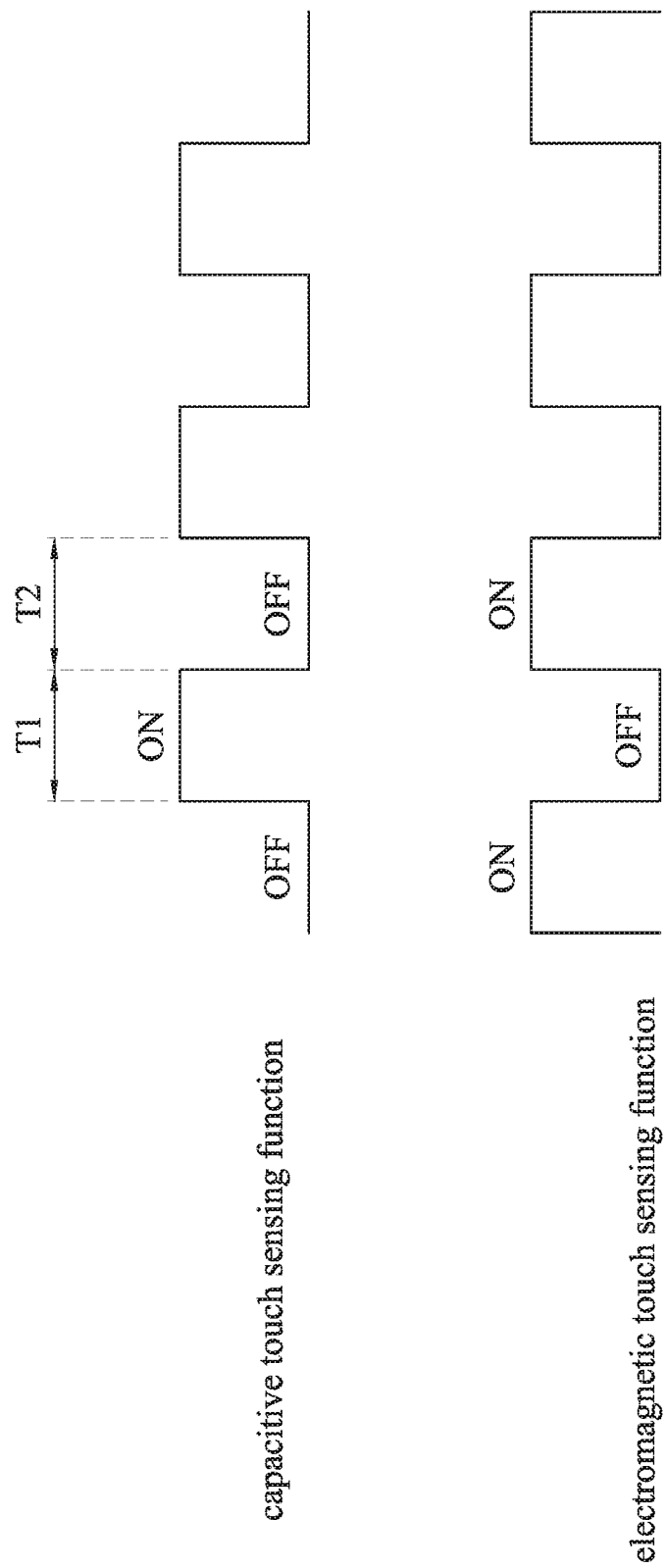
FIG. 5 is a schematic diagram showing a time sequence of a capacitive touch sensing function and an electromagnetic touch sensing function in accordance with an embodiment of the present disclosure.

For example, the switch module 114 is configured to electrically connect the capacitive touch sensing module 116 with the driving electrode lines 112a and the receiving electrode lines 112b in a first touch sensing period to perform the capacitive touch sensing function for sensing the touch of a finger of a user. Further, the switch module 114 is configured to electrically connect the electromagnetic touch sensing module 118 with the driving electrode lines 112a and the receiving electrode lines 112b in a second touch sensing period to perform the electromagnetic touch sensing function for sensing the touch of an electromagnetic pen. In this embodiment, as shown in FIG. 5, the first touch sensing period T1 and the second touch sensing period T2 are staggered with one another, thereby avoiding the interference between the capacitive touch sensing function and the electromagnetic touch sensing function.

Figure 6:
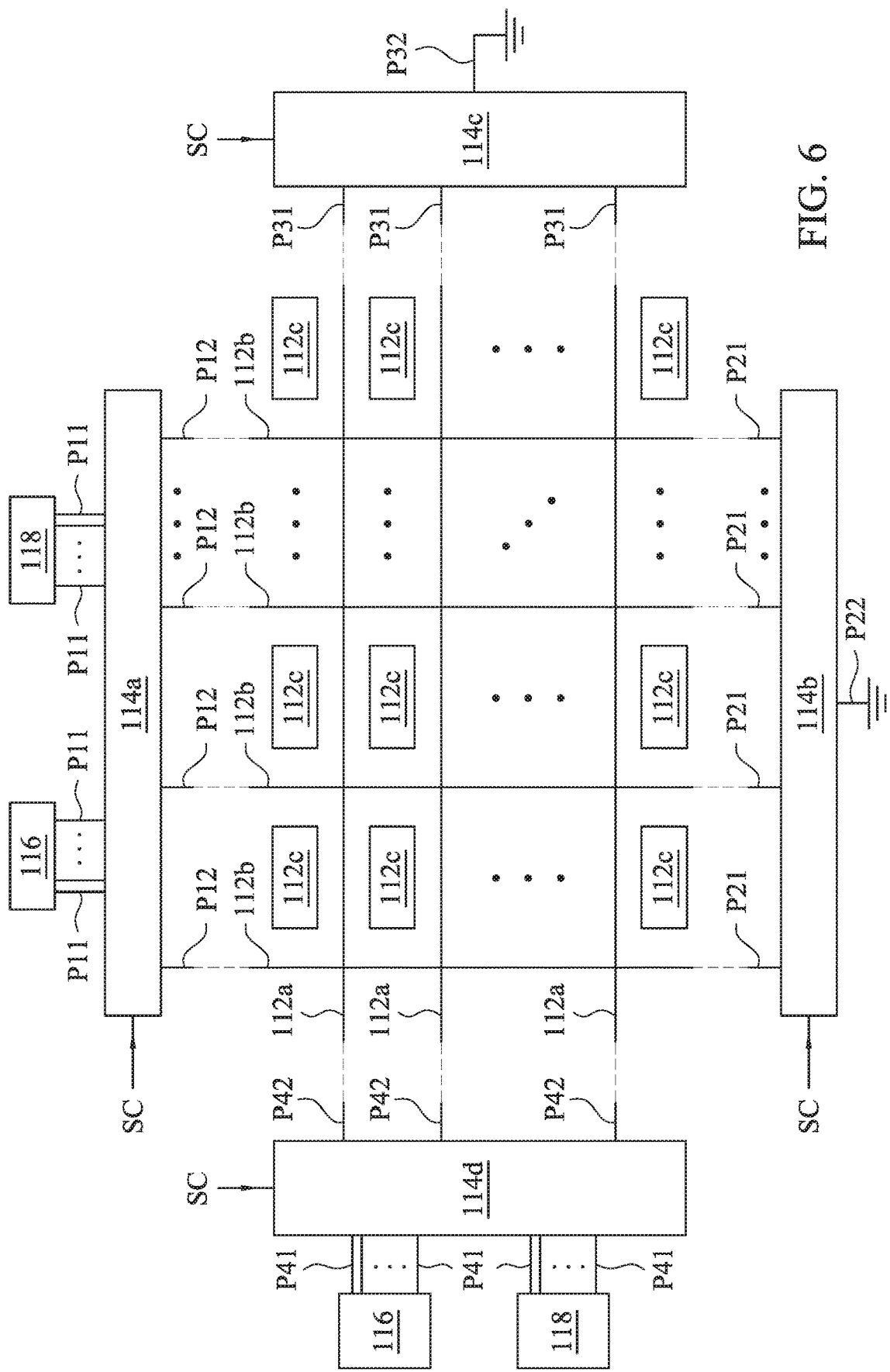
FIG. 6 is a schematic diagram showing a structure of the switch module in accordance with an embodiment of the present disclosure.

Referring to FIG. 6, FIG. 6 is a schematic diagram showing a structure of the switch module 114 in accordance with an embodiment of the present disclosure. The switch module 114 includes a first multiplexer 114a, a second multiplexer 114b, a third multiplexer 114c, and a fourth multiplexer 114d. The first multiplexer 114a, the second multiplexer 114b, the third multiplexer 114c, and the fourth multiplexer 114d are used to switch the capacitive touch sensing module 116 and the electromagnetic touch sensing module 118 in accordance with a mode control signal SC input from an external device, so as to electrically connect one of the capacitive touch sensing module 116 or the electromagnetic touch sensing module 118 with the driving electrode lines 112a and the receiving electrode lines 112b. For example, when the mode control signal SC has a high logic level, the first multiplexer 114a, the second multiplexer 114b, the third multiplexer 114c, and the fourth multiplexer 114d electrically connect the capacitive touch sensing module 116 with the driving electrode lines 112a and the receiving electrode lines 112b to perform the capacitive touch sensing function. As another example, when the mode control signal SC has a low logic level, the first multiplexer 114a, the second multiplexer 114b, the third multiplexer 114c, and the fourth multiplexer 114d electrically connect the electromagnetic touch sensing module 118 with the driving electrode lines 112a and the receiving electrode lines 112b to perform the electromagnetic touch sensing function.

At first, the first multiplexer 114a and the second multiplexer 114b are considered. The first multiplexer 114a has plural input pins P11 and plural output pins P12. The input pins P11 are electrically connected to the capacitive touch sensing module 116 and the electromagnetic touch sensing module 118, respectively. The output pins P12 are electrically connected to the receiving electrode lines 112b. The second multiplexer 114b has plural input pins P21 and at least one output pin P22. The input pins P21 are electrically connected to the receiving electrode lines 112b, and the output pin P22 is electrically grounded.

When the mode control signal SC has the high logic level, the first multiplexer 114a enables the electric connection between the output pins P12 and the input pins P11 connected to the capacitive touch sensing module 116, so that the first multiplexer 114a can electrically connect the capacitive touch sensing module 116 with the receiving electrode lines 112b. At the same time, the second multiplexer 114b sets the input pins P21 into a "floating" state, so that the receiving electrode lines 112b can be used as receiving electrodes (RX) for capacitive touch sensing.

When the mode control signal SC has the low logic level, the first multiplexer 114a enables the electric connection between the output pins P12 and the input pins P11 connected to the electromagnetic touch sensing module 118, so that the first multiplexer 114a can electrically connect the electromagnetic touch sensing module 118 with the receiving electrode lines 112b. At the same time, the second multiplexer 114b enables the electric connection between the input pins P21 and the output pin P22, so that the receiving electrode lines 112b can be used as an antenna for electromagnetic touch sensing.

Thereafter, the third multiplexer 114c and the fourth multiplexer 114d are considered. The fourth multiplexer 114d has plural input pins P41 and plural output pins P42. The input pins P41 are electrically connected to the capacitive touch sensing module 116 and the electromagnetic touch sensing module 118, respectively. The output pins P42 are electrically connected to the driving electrode lines 112a. The third multiplexer 114c has plural input pins P31 and at least one output pin P32. The input pins P31 are electrically connected to the driving electrode lines 112a, and the output pin P32 is electrically grounded.

When the mode control signal SC has the high logic level, the fourth multiplexer 114d enables the electric connection between the output pins P42 and the input pins P41 connected to the capacitive touch sensing module 116, so that the fourth multiplexer 114d can electrically connect the capacitive touch sensing module 116 with the driving electrode lines 112a. At the same time, the third multiplexer 114c sets the input pins P31 into a "floating" state, so that the driving electrode lines 112a can be used as driving electrodes (TX) for capacitive touch sensing.

When the mode control signal SC has the low logic level, the fourth multiplexer 114d enables the electric connection between the output pins P42 and the input pins P41 connected to the electromagnetic touch sensing module 118, so that the fourth multiplexer 114d can electrically connect the electromagnetic touch sensing module 118 with the driving electrode lines 112a. At the same time, the third multiplexer 114c enables the electric connection between the input pins P31 and the output pin P32, so that the driving electrode lines 112a can be used as an antenna for electromagnetic touch sensing.

As described above, when the mode control signal SC has the high logic level, the first multiplexer 114a, the second multiplexer 114b, the third multiplexer 114c, and the fourth multiplexer 114d electrically connect terminals of the driving electrode lines 112a and the receiving electrode lines 112b with the capacitive touch sensing module 116 and set other terminals of the driving electrode lines 112a and the receiving electrode lines 112b into a "floating" state at the same time. Therefore, the capacitive touch sensing module 116 can perform the capacitive touch sensing by using the driving electrode lines 112a and the receiving electrode lines 112b as driving electrodes and receiving electrodes. Further, when the mode control signal SC has the low logic level, the first multiplexer 114a, the second multiplexer 114b, the third multiplexer 114c, and the fourth multiplexer 114d electrically connect terminals of the driving electrode lines 112a and the receiving electrode lines 112b with the electromagnetic touch sensing module 118 and electrically ground other terminals of the driving electrode lines 112a and the receiving electrode lines 112b at the same time. Therefore, the electromagnetic touch sensing module 118 can perform the electromagnetic touch sensing by using the driving electrode lines 112a and the receiving electrode lines 112b as an antenna. By controlling the logic level of the mode control signal SC, the capacitive touch sensing and the electromagnetic touch sensing can be switched.

In addition, regarding a problem of impedance matching of antenna, a specific number (for example, three) of the driving electrode lines 112a/receiving electrode lines 112b can be considered as a signal channel to overcome the problem of impedance matching of antenna.

In conclusion, the embodiments of the present disclosure integrate the driving electrode lines 112a and the receiving electrode lines 112b into the backlight module 110 to decrease the thickness of the whole touch display device 100. Further, the fabrication of the driving electrode lines 112a and the receiving electrode lines 112b can be integrated into the fabrication processes of the substrate (e.g., the printed circuit board), thereby forming the driving electrode lines 112a and the receiving electrode lines 112b by metal material (for example, copper) to significantly decrease the resistance of the driving electrode lines 112a and the receiving electrode lines 112b and the fabrication time and cost of the touch display device 100. Furthermore, the switch module 114 switches the electromagnetic touch sensing module 118 and the capacitive touch sensing module 116 to perform the electromagnetic touch sensing and the capacitive touch sensing in different time periods, thereby avoiding interference between the capacitive touch sensing and the electromagnetic touch sensing.

The foregoing embodiments are illustrative of the present invention rather than limiting of the present invention. It will be apparent that various modifications, equivalent replacements, and variations fall within the scope of the following claims of the present invention without departing from the spirit and principle of the invention.

What is claimed is:

1. A backlight module comprising:
   a substrate;
   a plurality of driving electrode lines disposed on the substrate;
   a plurality of receiving electrode lines disposed on the substrate, wherein the receiving electrode lines and the driving electrode lines define a plurality of light source regions on the substrate;
   a plurality of light sources disposed in the light source regions, wherein each of the light source regions has at least one of the light sources disposed therein; and
   a switch module configured to switch between a first state and a second state, wherein:
   the switch module comprises:
      a first multiplexer having a first set of input pins coupled to a capacitive touch sensing module, a second set of input pins coupled to an electromagnetic touch sensing module, and a set of output pins coupled to first terminals of the receiving electrode lines; and
      a second multiplexer having a first set of input pins coupled to second terminals of the receiving electrode lines and an output pin coupled to ground,
   when the switch module is in the first state, the second terminals of the receiving electrode lines and first terminals of the driving electrode lines are in a floating state, and
   when the switch module is in the second state, the second terminals of the receiving electrode lines and the first terminals of the driving electrode lines are electrically coupled to the ground.

2. The backlight module of claim 1, wherein the switch module comprises:
   a third multiplexer having a first set of input pins coupled to the capacitive touch sensing module, a second set of input pins coupled to the electromagnetic touch sensing module, and a set of output pins coupled to second terminals of the driving electrode lines; and
   a fourth multiplexer having a first set of input pins coupled to the first terminals of the driving electrode lines and an output pin coupled to the ground.

3. The backlight module of claim 1, wherein the substrate is a copper foil substrate.

4. The backlight module of claim 1, wherein the driving electrode lines and the receiving electrode lines are disposed on a same surface of the substrate.

5. The backlight module of claim 1, wherein the driving electrode lines are disposed on a first surface of the substrate and the receiving electrode lines are disposed on a second surface of the substrate different than the first surface of the substrate.

6. The backlight module of claim 1, wherein at least one of the receiving electrode lines or the driving electrode lines are embedded in the substrate.

7. The backlight module of claim 1, wherein the light sources are light-emitting diodes.

8. The backlight module of claim 1, wherein the substrate is a printed circuit board.

9. The backlight module of claim 1, wherein the receiving electrode lines and the driving electrode lines are copper conductive lines.

10. A backlight module comprising:
    a substrate;
    a plurality of driving electrode lines disposed on the substrate;
    a plurality of receiving electrode lines disposed on the substrate, wherein the receiving electrode lines and the driving electrode lines define a plurality of light source regions on the substrate;
    a plurality of light sources disposed in the light source regions, wherein each of the light source regions has at least one of the light sources disposed therein; and
    a switch module electrically connected to the receiving electrode lines and the driving electrode lines, wherein:
    the switch module comprises:
       a first multiplexer having a first set of input pins coupled to a capacitive touch sensing module, a second set of input pins coupled to an electromagnetic touch sensing module, and a set of output pins coupled to first terminals of the receiving electrode lines; and
       a second multiplexer having a first set of input pins coupled to second terminals of the receiving electrode lines and an output pin coupled to ground, and
    one or more output pins of the switch module are coupled to the ground to selectively electrically ground the second terminals of the receiving electrode lines and first terminals of the driving electrode lines.

11. The backlight module of claim 10, wherein the switch module comprises:
    a third multiplexer having a first set of input pins coupled to the capacitive touch sensing module, a second set of input pins coupled to the electromagnetic touch sensing module, and a set of output pins coupled to second terminals of the driving electrode lines; and
    a fourth multiplexer having a first set of input pins coupled to the first terminals of the driving electrode lines and an output pin coupled to the ground.

12. The backlight module of claim 10, wherein the substrate is a copper foil substrate.

13. The backlight module of claim 10, wherein the driving electrode lines and the receiving electrode lines are disposed on a same surface of the substrate.

14. The backlight module of claim 10, wherein the driving electrode lines are disposed on a first surface of the substrate and the receiving electrode lines are disposed on a second surface of the substrate different than the first surface of the substrate.

15. The backlight module of claim 10, wherein at least one of the receiving electrode lines or the driving electrode lines are embedded in the substrate.

16. The backlight module of claim 10, wherein the light sources are light-emitting diodes.

17. The backlight module of claim 10, wherein the substrate is a printed circuit board.

18. The backlight module of claim 10, wherein the receiving electrode lines and the driving electrode lines are copper conductive lines.

19. A backlight module comprising:
    a substrate;
    a plurality of driving electrode lines disposed on the substrate;
    a plurality of receiving electrode lines disposed on the substrate, wherein the receiving electrode lines and the driving electrode lines define a plurality of light source regions on the substrate;
    a plurality of light sources disposed in the light source regions, wherein each of the light source regions has at least one of the light sources disposed therein; and
    a switch module electrically connected to the receiving electrode lines and the driving electrode lines, wherein:
        the switch module comprises:
            a first multiplexer having a first set of input pins coupled to a capacitive touch sensing module, a second set of input pins coupled to an electromagnetic touch sensing module, and a set of output pins coupled to first terminals of the driving electrode lines; and
            a second multiplexer having a first set of input pins coupled to second terminals of the driving electrode lines and an output pin coupled to ground, and
        one or more output pins of the switch module are coupled to the ground to selectively electrically ground first terminals of the receiving electrode lines and the second terminals of the driving electrode lines.

20. The backlight module of claim 19, wherein the substrate is a copper foil substrate.

* * * * *